United States Patent Office 3,467,639
Patented Sept. 16, 1969

3,467,639
CATALYTIC COMPOSITIONS FOR POLYMERIZATION AND COPOLYMERIZATION OF ALPHA-MONO-OLEFINS, AND PROCESSES USING SUCH COMPOSITIONS
Walter Marconi and Sebastiano Cesca, San Donato Milanese, and Sergio Arrighetti, Chiari, Italy, assignors to SNAM S.p.A., Milan, Italy, a company of Italy
No Drawing. Filed Oct. 14, 1965, Ser. No. 496,154
Claims priority, application Italy, Feb. 3, 1965, 888
Int. Cl. C08f 15/04, 3/08; B01j 11/78
U.S. Cl. 260—88.2        2 Claims

ABSTRACT OF THE DISCLOSURE

For polymerization and copolymerization of alpha-mono-olefins a composition is employed comprising a compound of a transition metal selected from the IV to VIII groups of the Periodic System and an aluminum compound which is a linear polymer of polyiminic nature containing at least four, and preferably between four and fifty repeating units:

where R is a hydrocarbon radical selected from alkyl, aryl, and cycloalkyl radicals.

---

The present invention relates to new catalytic compositions which can be used in alpha-olefins polymerization, and to the polymerization processes using said compositions.

Polymerization processes of ethylenic unsaturated compounds are known in the art which are based on the use of catalytic systems comprising a transition metal compound together with special aluminum compounds.

Such compounds have been widely referred to and very generally represented as corresponding to general formulas of the type:

$$AlR_2X \text{ and } AlRX_2$$

where X represents a hydrocarbon radical, hydrogen, halogen, a secondary amine-residue, a mercaptan radical etc.; and R represents substantially a hydrocarbon radical.

Essentially, the above mentioned formulas are relative to aluminum metal organic compounds. In particular ethylene polymerization is recorded in German Patents Nos. 1,012,460 and 1,016,022 in the name of K. Ziegler while propylene polymerization is recorded in Italian Patent No. 537,164 in the name of Montecatini.

Successively many other patents have been applied for and issued regarding the copolymerization of olefins or of olefins with other unsaturated compounds. We have now found a new class of compounds useful as components of catalytic systems for the preparation of highly crystalline polymers or of amorphous copolymers of alpha-olefins.

The new class of compounds of the present invention is made up by linear polymeric aluminum compounds of polyiminic nature containing repeating units of the type

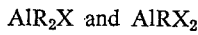

where R represents an aryl, alkyl or cycloalkyl hydrocarbon radical.

Said compounds can be easily prepared by reaction of $LiAlH_4$ with the amine hydrochlorides or by reaction of $AlH_3$ with primary amines:

(1)
$$nR-NH_2 \cdot HCl + nLiAlH_4 \longrightarrow$$

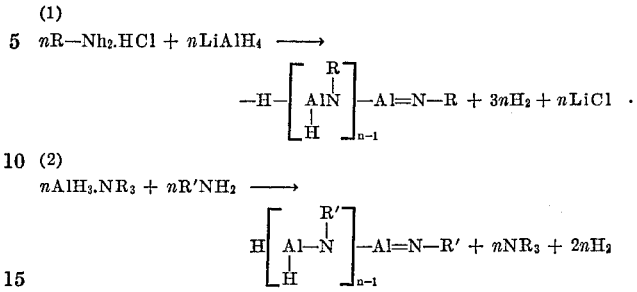

(2)
$$nAlH_3 \cdot NR_3 + nR'NH_2 \longrightarrow$$

where R and R' are the same or different and are selected from aryl, alkyl or cycloalkyl hydrocarbon radicals such as, for example: $CH_3$, $C_2H_5$, $nC_4H_9$, $C_6H_5$ and the like.

Said compounds will be also defined as aluminum iminic polymers in the course of the present description.

The preparation of said compounds is described by E. Wiberg and A. May in "Z. f. Naturforsch.," 106, 232 (1955) and more particularly by R. Ehrlich and coll. in "Inorg. Chem.," 3 628 (1964).

Molecular weight measurements show them to be polymers having $n \geq 4$.

When $n$ is small (from 4 to about 50) said compounds are soluble in aromatic and sometimes aliphatic solvents. Higher molecular weight compounds are insoluble in the common solvents although they are still effective as catalysts in the presence, e.g., of $TiCl_4$, since they still contain an equivalent of active hydrogen for each aluminum atom. Said compounds, principally with respect to the aluminum alkyl compounds used in the art, have the advantage of a higher stability with respect to oxydizing and hydrolising agents and a better handling. Together with the aluminum iminic polymers, compounds of transition metal of the IV to VIII groups of the Periodic System are used. Examples of such compounds are $TiCl_4$, $TiCl_3$, $VCl_3$, $VOCl_3$, $VO(OC_2H_5)_3$. $ZrCl_4$ and the like.

Monomers that can be used according to the present invention to prepare both homopolymers and copolymers are hydrocarbons having an ethylenic unsaturation, such as ethylene, propylene, butene-1, pentene-1, hexene-1, 3-methyl-pentene-1, 4-methyl-pentene-1, and homologues having up to 12 carbon atoms in their molecules.

The polymerization of unsaturated compounds using the catalytic compositions of the present invention presents no difficulty in its practical realization. Operations are carried out essentially at temperatures between —50° C. and +120° C. preferably between —30° C. and +80° C., and at pressures between 1 to 100 atmospheres.

The solvents used are the conventional ones and consist of aliphatic, aromatic and cycloaliphatic hydrocarbons. Examples of them are: benzene, toluene, xylene, n-heptane, cyclohexane and the like.

By using the catalytic systems of the invention it is possible to obtain from alpha-olefins some polymers having a high crystallinity as measured by X-rays, while, on the other hand, the copolymers of alpha-olefins so obtained are essentially amorphous since they do not present practically any crystallinity. In order to better illustrate the present invention, examples are presented, which must not be considered in any way as limiting the invention.

EXAMPLE 1

In a tubular glass reactor, having a capacity of 800 cc., provided with mechanical agitator, thermometric measuring element, and a tube for the gas inlet, nitrogen is substituted for air and successively 400 cc. of anhydrous toluene are introduced into it and at atmospheric pressure a stream of ethylene at the rate of 120Nl./hr. When the toluene is saturated with gas, under agitation and after having put the reactor into a thermostat at 20° C., 4.54 mmoles of TiCl$_4$ and 12.0 cc. of a benzenic solution of the n-butyl-iminic polymer containing 9.44 mgr. atoms/lt. of Al are introduced.

A strong heat development is immediately noticed which is not absorbed by the bath and which causes the temperature of the polymerization suspension to rise to 72° C. in 10 minutes. The polymerization is cut off by adding some cc. of alcohol and after coagulation with ethanol containing about 5% of concentrated HCl and drying in oven at reduced pressure, 17.3 gr. of a white powder are obtained which under X-ray examination shows the characteristic spectrum of linear polyethylene (87% crystallinity) while intrinsic viscosity determination, in tetraline at 135° C. gives $[\eta]$=5.82 dl./gr.

EXAMPLE 2

Into a 500 cc. tilting autoclave, deaerated and thermostated with a fluid circulating at 75° C., a catalytic suspension made up of 0.8 gr. of TiCl$_3$ containing in solid solution ⅓ of AlCl$_3$, 8.65 mgr. atoms of Al present as n-butyl-iminic polymer and 250 cc. of benzene is transferred by siphon, under inert atmosphere.

Propylene is then introduced until a constant pressure of 7 atm. is achieved is kept during the whole polymerization time of two hours. After coagulation and drying, which are carried out in the usual way, 53 gr. of white polymer are recuperated which under X-ray examination show the characteristic spectrum of isotactic polypropylene (65% crystallinity by X-ray examination), while the intrinsic viscosity measurement gives $[\eta]$=3.86 dl./gr.

Melting point determination by polarizing microscope gives 172° C. while the exhausting extraction with boiling n-heptane gives a residue of 82%.

EXAMPLE 3

Operating with the same procedure as described in the previous example, 1.0 gr. of TiCl$_3$ containing ⅓ of AlCl$_3$ in solid solution, 10.8 mgr. atoms of Al present as n-butyl-iminic polymer and 250 cc. of benzene are introduced into the autoclave.

The autoclave is thermostated at 70° C. and is brought to 4 atm. with butene-1; such pressure is kept constant during the whole polymerization time which goes on for 4 hours. After coagulation and drying, 24.7 gr. of white powder are obtained which under X-ray examination is shown to be crystalline (45% crystallinity) and shows a melting point of 137° C. The intrinsic viscosity measurement gives $[\eta]$=2.85 dl./gr. in tetraline at 135° C.

EXAMPLE 4

Into a 100 cc. three neck flask provided with mechanical agitator and reflux cooler, 0.6 gr. of TiCl$_3$ containing ⅓ of AlCl$_3$ in solid solution, 6.5 mgr. atoms of Al present as ethyl-iminic polymer, 50 cc. of toluene and 20 cc. of n-pentene-1 are introduced under inert atmosphere. The flask is put in thermostat at 70° C. and in 60 minutes an abundant formation of polymer takes place which tends to stick to the stirrer. After coagulation and drying 13.17 grams of white powder are obtained (total conversion) which is crystalline under X-ray examination; the melting point observed is 73° C. while the intrinsic viscosity (in tetraline at 135° C.) gives $[\eta]$=2.67 dl./gr.

EXAMPLE 5

The procedures of the previous example are repeated, introducing into the flask 0.45 gr. of TiCl$_3$ containing in solid solution ⅓ of AlCl$_3$, 4.85 mgr. atoms of Al present as ethyliminic polymer, 20 cc. of toluene and 20 cc. of n-hexene-1. The flask is put into a thermostat at 75° C.; over a period of 5 minutes a massive formation of polymer is observed, which, after coagulation and drying, weighs 12.64 gr. Under examination by X-rays it shows to be amorphous while intrinsic viscosity determination gives $[\eta]$=1.73 dl./gr. (in tetraline at 135° C.).

EXAMPLE 6

The procedure of Example 4 is repeated introducing into the flask 0.58 gr. of TiCl$_3$ containing in solid solution ⅓ of AlCl$_3$, 9.7 mgr. atoms of Al present as ethyliminic polymer 80 cc. of toluene and 20 cc. of 4-methylpentene-1. The flask is put into a thermostat at 75° C. for 2 hours. After the polymerization is stopped, and after coagulation and drying, 12.8 gr. of polymer are obtained (yield 96%) which under X-rays examination is shown to be highly crystalline (56%) and has an intrinsic viscosity $[\eta]$=3.40 dl./gr. (in tetraline at 135° C.). The melting point observed is 230° C., while the residue after exhausting n-heptane extraction is 72%.

EXAMPLE 7

Into a 250 cc. autoclave 0.9 gr. of TiCl$_3$, 14.6 mgr. atoms of Al present as ethyl-iminic polymer, 50 cc. of toluene and 70 cc. of 3-methyl-butene-1 are introduced. The autoclave is kept at 75° C. for 7 hours: at the end 3.7 gr. of polymer are obtained which is highly crystalline under X-ray examination.

Intrinsic viscosity measurement in tetraline at 135° C. gives $[\eta]$= 1.72 dl./gr., while the melting point is higher than 240° C.

EXAMPLE 8

Into a tubular glass reactor fitted with mechanical stirrer, thermometric measuring element, and a tube for gas inlet, 400 cc. of n-heptane are introduced under inert atmosphere which are thermostated at the temperature of −20° C. The hydrocarbon solvent is saturated with a gaseous stream of propylene and ethylene having a molar ratio 2.4. Then 4.77 mgr. atoms of Al as n-butyl-iminic polymer and 1.88 moles of VCl$_4$ are introduced into the reactor. Over a period of 10 minutes of polymerization, during which time the monomer stream is continued at the rate of 200 Nl./hr. keeping a temperature of about −20° C., 9.3 gr. of elastomer are produced which is essentially amorphous under X-rays examination and shows an ethylene content of 52% by moles and an intrinsic viscosity (in tetraline at 135° C.) $[\eta]$=4.05 dl./gr.

EXAMPLE 9

Using the apparatus described in Example 8, kept at −20° C., 400 cc. of n-heptane are introduced into the reactor which are saturated with a propylene/ethylene mixture having a molar ratio 2.5 and a flow rate of 200 Nl./hr. Successively 13.9 mgr. atoms of Al present at phenyl-iminic polymer and 5.3 mmoles of VOCl$_3$ are introduced into the solvent. Over a period of 11 minutes 9.3 gr. of elastomer are obtained which under X-ray examination appear as essentially amorphous, while the ethylene content is 56% by mole. Intrinsic viscosity measurement gives $[\eta]$=3.19 dl./gr.

EXAMPLE 10

Into a 100 cc. glass flask, fitted with mechanical stirrer, 0.50 gr. of TiCl$_3$, 30 cc. of anhydrous toluene and 8.5 mgr. atoms of Al present as ethyl-iminic polymer and finally 15 cc. of styrene are introduced under inert atmosphere. The flask is brought to 75° C. and kept under stirring for two hours: at the end 4.8 gr. of polymer are obtained (35.3% conversion) which is highly crystalline under X-ray examination and has a melting point of 232° C. Intrinsic viscosity measurement in tetraline at 135° C. gives $[\eta]$=4.15 dl./gr.

The embodiments of the invention in which an exclusive property or privilege is claimed are defined as follows:

1. A process for the preparation of highly crystalline polymers of alpha-mono-olefins, wherein the polymerization reaction is carried out in the presence of a catalyst which is the interaction product of a compound of a transition metal selected from the group consisting of titanium trichloride, titanium tetrachloride, vanadium tetrachloride, vanadium oxychloride, vanadium oxyethylate, and zirconium tetrachloride, and a polyiminoalane represented by the formula

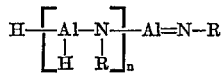

wherein

R is an alkyl, aryl, or cycloalkyl radical, and $n$ is at least 4.

2. process as claimed in claim 1, wherein $n$ is between 4 and 50, the reaction is effected in a solvent, selected from the group consisting of aliphatic, aromatic and cycloaliphatic hydrocarbons, and at a temperature between —50° C. and 120° C. and at a pressure between 1 and 100 atmospheres.

References Cited

UNITED STATES PATENTS 3,255,169 6/1966 Kearby _____ 260—93.7
3,163,611 12/1964 Andersen et al. _____ 252—429

JOSEPH L. SCHOFER, Primary Examiner

E. J. SMITH, Assistant Examiner

U.S. Cl. X.R.

252—429; 260—93.5, 93.7, 94.9